Patented Apr. 11, 1950

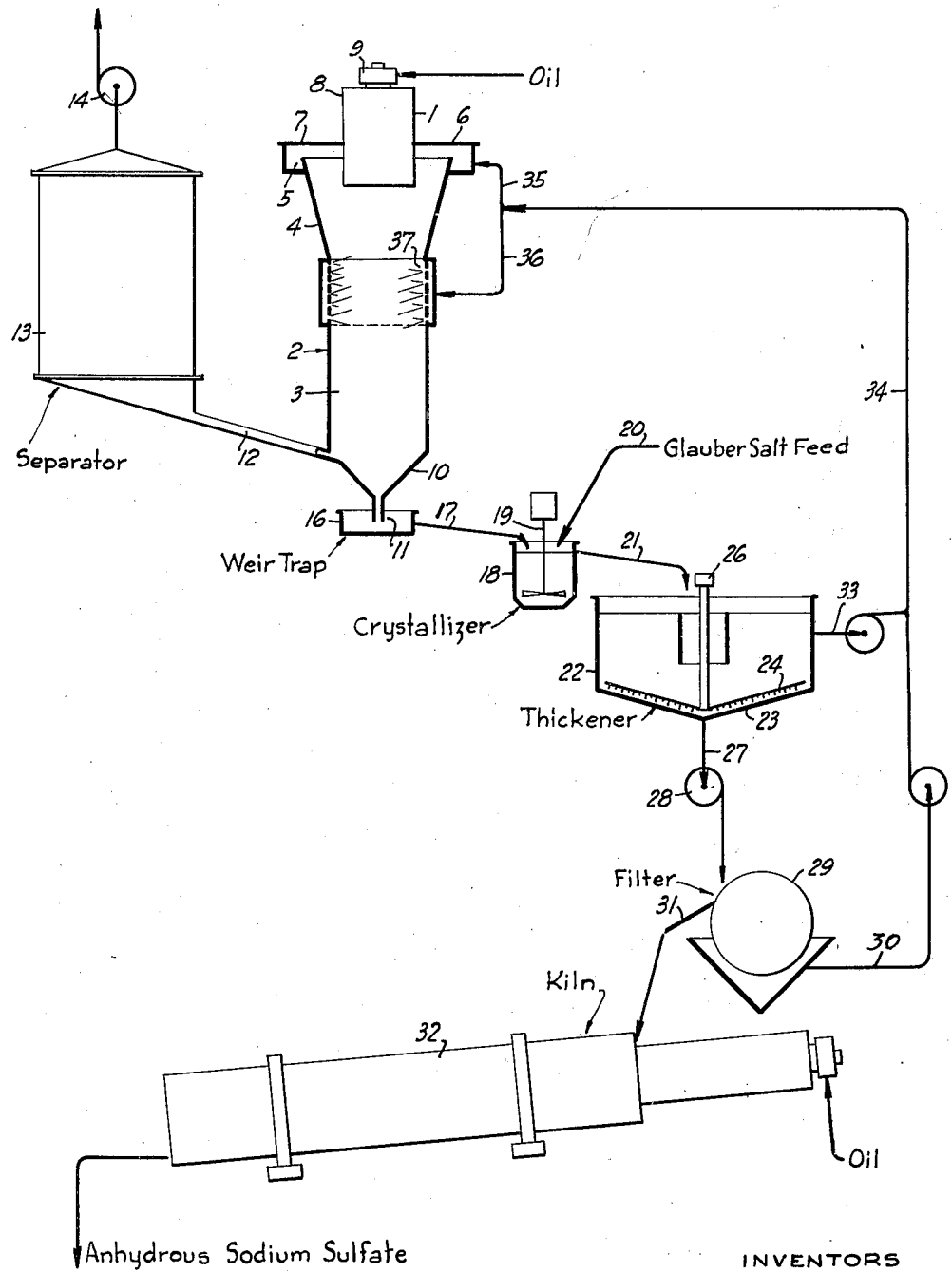

2,504,097

UNITED STATES PATENT OFFICE 2,504,097

PROCESS FOR PRODUCING ANHYDROUS SODIUM SULFATE

James V. Wiseman, Lynn A. Blackmun, and Henry D. Hellmers, Westend, Calif., assignors to West End Chemical Company, a corporation of California Application August 30, 1948, Serial No. 46,904

4 Claims. (Cl. 23—121)

This invention relates to the concentration of solutions of salts and is particularly applicable to the production of anhydrous forms of salts having an inverted solubility curve (the salt becomes less soluble as the solution temperature is increased), and to apparatus for carrying on the method.

Preparation of anhydrous forms of salts such as sodium sulfate decahydrate and sodium carbonate decahydrate presents special difficulties when attempted by evaporation, using heat transfer through a wall. Salts having a normal solubility curve may readily be dehydrated by such means as a multiple-effect evaporator or other apparatus in which heat is transferred through a wall to raise the temperature above the boiling point of the solution and thus to evaporate the liquid from the solute. When this is attempted with salts such as the two mentioned, however, the salt, being less soluble at the higher temperature of the wall than at the somewhat lower temperature existing a short distance from the wall, deposits upon the heat transfer wall. The salt, not being an effective conductor of heat, quickly decreases the efficiency of operation to such an extent as to make its cost prohibitive. This necessitates frequent shut-down of the apparatus and removal of the salt scale or film on the wall, as by boiling out. Not only is a portion of the product lost in this fashion, but the expense of operation is increased greatly.

There are other methods for recovering the anhydrous salts from their hydrated form, but all have disadvantages. For example, sodium sulfate may be salted out by the use of solid sodium chloride, but not only is approximately 30% of the sodium sulfate lost, but the sodium chloride is not recovered. The process accordingly depends upon a plentiful supply of comparatively cheap solid sodium chloride.

It is an object of this invention to provide a process making use of heat to evaporate the water from the hydrated form of salts, and particularly those having inverted solubility curves, while substantially completely avoiding the caking-up of the salt on the walls of the container in which evaporation is carried out.

It is a further object of the invention to dehydrate salts by the application of heat directly to the solution and not through the medium of solid wall.

A further and more specific object of the invention is to provide an economically feasible and practicable method for dehydrating sodium sulfate decahydrate and sodium carbonate decahydrate by the use of heat to evaporate the water therefrom.

A further and important object of the invention is to provide apparatus capable of extended periods of use in evaporating water from solutions of salts in water without necessary shutdown for washing out.

Other objects of the invention will appear as the description proceeds.

The drawing is a flow sheet showing the evaporator and other essential elements of apparatus and their method of operation in order to carry out the process.

In the drawing, reference numeral 1 refers generally to the evaporator which includes a tubular vessel 2, having an intermediate cylindrical portion 3 carrying a frusto-conical portion 4 at its upper end flaring outwardly with its upper peripheral edge 5 positioned horizontally. A liquid distribution device 6, in the form of an annular ring, surrounds the peripheral edge 5, the latter being serrated to provide a plurality of overflow weirs to distribute liquid as a film over the interior surface of the evaporator. The liquid distribution device 6 includes a cover 7 supporting a combustion box 8 carrying a fuel burner 9 to provide for generation of a hot drying gas which is discharged directly and downwardly into the tubular evaporator. At its opposite end, the evaporator is closed by another frusto-conical portion 10, the latter having an outlet pipe 11 for collecting and carrying away liquid from the bottom of the vessel. Combustion gas is taken off at the side of the evaporator through outlet 12 into a gas-liquid separator device 13, the outlet from which is connected to blower 14 to provide for a positive draft through the device.

Liquid passing through pipe 11 collects in vessel 16, the latter acting as a weir trap for the liquid from which the overflow is taken off through pipe 17 into crystallizer 18. A motor driven paddle, generally indicated by numeral 19, is provided in the crystallizer for mixing the liquid therein with make-up feed added through pipe 20. The overflow from the crystallizer is delivered by line 21 to thickener basin 22, the latter having an inwardly sloping bottom 23 over which rake arms 24 are adapted to be moved by a suitable motivating device 26. Solids collecting at the central portion of the thickener are taken off through line 27 and are forced by pump 28 to a filter 29; from this the solids are taken off by a scraper 31 and thence delivered to a suitable drying device such as the kiln generally indicated at 32. Liquid taken off filter 29 is rean upper portion of said zone to evaporate water from said solution, collecting said solution, saturated with respect to sodium sulfate and at a temperature above the transition temperature of sodium sulfate decahydrate to sodium sulfate, at a lower portion of said zone, removing said solution from said zone, then mixing sodium sulfate decahydrate into said solution in an amount sufficient to replace the water removed in the aforesaid evaporation step upon melting of the decahydrate in said solution and precipitate solid anhydrous sodium sulfate and provide a solution saturated with respect to sodium sulfate at a temperature of 130°–185° F., then removing the precipitated solid anhydrous sodium sulfate from the sodium sulfate saturated solution and then returning said sodium sulfate saturated solution to the aforesaid evaporation step.

3. In a process for producing anhydrous sodium sulfate, the steps consisting in burning a combustible at the upper end of a vertically disposed tubular combustion zone and discharging productions of combustion from a lower portion of said zone, said zone being defined by vertically disposed tubular wall surfaces, discharging one portion of a saturated solution of sodium sulfate from an upper portion of said zone as a liquid film over the surface of said tubular wall to maintain said wall surfaces wet, spraying another portion of said saturated solution of sodium sulfate into said zone to wash combustion gases and to evaporate water from said solution, collecting said solution saturated with respect to sodium sulfate and at a temperature of about 184° F. at a lower portion of said zone, removing said solution from said zone, then mixing sodium sulfate decahydrate into said solution in an amount sufficient to replace the water removed in the aforesaid evaporation step upon melting of the decahydrate in said solution and precipitate solid anhydrous sodium sulfate and provide a solution saturated with respect to sodium sulfate at a temperature of about 130°–185° F., then removing the precipitated solid anhydrous sodium sulfate from the sodium sulfate saturated solution and then returning said sodium sulfate saturated solution to the aforesaid evaporation step.

4. In a process for producing anhydrous sodium sulfate, the steps consisting in discharging a continuous stream of a saturated solution of sodium sulfate downwardly as a thin tubular liquid film from the upper end of a combustion zone to the lower end thereof and spraying additional saturated solution of sodium sulfate into the free space of said zone to evaporate water from said solution, collecting said solution saturated with respect to sodium sulfate and at a temperature above the transition temperature of $Na_2SO_4 \cdot 10H_2O$ to $Na_2SO_4$ and $H_2O$, at a lower portion of said zone, removing said solution from said zone, then mixing sodium sulfate decahydrate into said solution in an amount sufficient to replace the water removed in the aforesaid evaporation step upon melting of the decahydrate in said solution and precipitate said anhydrous sodium sulfate and provide a solution saturated with respect to sodium sulfate, then removing the precipitated solid anhydrous sodium sulfate from the sodium sulfate saturated solution and then returning said sodium sulfate saturated solution to the aforesaid evaporation step.

JAMES V. WISEMAN.
LYNN A. BLACKMUN.
HENRY D. HELLMERS.

REFERENCES CITED

The following references are of record in the file of this patent:

UNITED STATES PATENTS

| Number | Name | Date |
|---|---|---|
| 392,286 | Pemberton | Nov. 6, 1888 |
| 505,520 | Guttmann | Sept. 26, 1893 |
| 1,254,689 | Hart | Jan. 29, 1918 |
| 1,503,481 | Cocksedge | Aug. 5, 1924 |
| 1,738,625 | Wietzel et al. | Dec. 10, 1929 |
| 1,969,793 | Hechenbleikner | Aug. 14, 1934 |
| 1,994,892 | MacMullin et al. | Mar. 19, 1935 |
| 2,086,902 | Doennecke | July 13, 1937 |
| 2,191,195 | Brown et al. | Feb. 20, 1940 |
| 2,272,345 | Kobe | Feb. 10, 1942 |
| 2,374,004 | Ebert | Apr. 17, 1945 |
| 2,374,285 | Harbaugh | Apr. 24, 1945 |
| 2,434,899 | Biggs | Jan. 27, 1948 |

OTHER REFERENCES

"Evaporation by Submerged Combustion," pages 589–592, I. & E. Chem., vol. 28, No. 5, by Kobe et al.